(12) United States Patent
Weber

(10) Patent No.: US 9,999,293 B2
(45) Date of Patent: Jun. 19, 2018

(54) MOP PROP, STICK STAY, AND BROOM BASE

(71) Applicant: Katherine Joanne Weber, Indianapolis, IN (US)

(72) Inventor: Katherine Joanne Weber, Indianapolis, IN (US)

( * ) Notice: Subject to any disclaimer, the term of this patent is extended or adjusted under 35 U.S.C. 154(b) by 0 days. days.

(21) Appl. No.: 15/610,347

(22) Filed: May 31, 2017

(65) Prior Publication Data

US 2018/0125226 A1    May 10, 2018

Related U.S. Application Data

(60) Provisional application No. 62/497,037, filed on Nov. 7, 2016.

(51) Int. Cl.
| | |
|---|---|
| *A46B 5/02* | (2006.01) |
| *A47L 13/00* | (2006.01) |
| *B25G 1/00* | (2006.01) |
| *A46B 17/02* | (2006.01) |
| *B25G 1/04* | (2006.01) |
| *A01B 1/02* | (2006.01) |

(52) U.S. Cl.
CPC ............... *A46B 17/02* (2013.01); *B25G 1/04* (2013.01); *A01B 1/02* (2013.01)

(58) Field of Classification Search
USPC ....... 248/685, 688, 519, 523, 524, 528, 110, 248/113, 408, 410, 411, 412, 413, 431, 248/345, 354.3, 354.5; 294/19.1, 57, 58, 294/59, 1.4, 100; 15/144.1, 175, 143.1, 15/246
See application file for complete search history.

(56) References Cited

U.S. PATENT DOCUMENTS

| | | | | |
|---|---|---|---|---|
| 513,022 | A * | 1/1894 | Loftin ................ | A46B 15/0095 248/688 |
| 539,357 | A * | 5/1895 | Davis ..................... | F16M 11/10 248/688 |
| 583,755 | A * | 6/1897 | Kelly ..................... | A47G 33/12 248/167 |
| 754,870 | A | 3/1904 | Hill | |
| 892,525 | A * | 7/1908 | Jorgensen .......... | A46B 15/0095 248/688 |
| 1,182,139 | A * | 5/1916 | Brown ............... | A46B 15/0095 248/688 |
| 1,280,072 | A * | 9/1918 | Neistrath .............. | A47L 13/512 248/113 |
| 2,441,697 | A | 5/1948 | Gage | |

(Continued)

*Primary Examiner* — Terrell L McKinnon
*Assistant Examiner* — Michael D McDuffie
(74) *Attorney, Agent, or Firm* — Ritchison Law Offices, PC; John D Ritchison

(57) ABSTRACT

A temporary or permanent attachment device to a broom, mop, or other such cleaning device, or other stick/rod, which needs to be propped upright temporarily when not in use or permanently during storage. The attachment provides the ability for the stick to stand freely, independent of leaning against a wall, furniture, door or other to prevent the stick from falling to the ground or against other objects, or people or pets or anything else on its way down. The attachment collapses against the stick. It is basically a case, springs, tines and release levers which are releasably attached to the extended handle of the tool.

11 Claims, 8 Drawing Sheets

(56) References Cited

U.S. PATENT DOCUMENTS

| | | | | |
|---|---|---|---|---|
| 2,753,879 A * | 7/1956 | Rosen | | A45B 3/00 |
| | | | | 135/15.1 |
| 3,132,834 A | 5/1964 | Adams | | |
| 4,052,808 A * | 10/1977 | Crabtree | | A01K 81/00 |
| | | | | 294/210 |
| 4,091,828 A * | 5/1978 | Jorgensen | | F16M 13/08 |
| | | | | 135/66 |
| 4,254,979 A * | 3/1981 | Bau | | E01H 1/1206 |
| | | | | 294/1.4 |
| 4,995,661 A * | 2/1991 | Aurness | | E01H 1/1206 |
| | | | | 294/1.4 |
| 5,161,772 A | 11/1992 | Di Resta et al. | | |
| 5,361,447 A | 11/1994 | Ophardt | | |
| 5,868,374 A | 2/1999 | Lomando | | |
| 5,920,944 A | 7/1999 | Biggs et al. | | |
| 5,974,775 A * | 11/1999 | Niehuss | | A01D 7/00 |
| | | | | 294/58 |
| 6,105,194 A * | 8/2000 | Rudolph | | A46B 5/005 |
| | | | | 15/143.1 |
| 6,106,042 A * | 8/2000 | McCloy, Jr. | | B66C 1/42 |
| | | | | 294/100 |
| 6,163,920 A * | 12/2000 | Meyer | | A46B 17/08 |
| | | | | 15/246 |
| 6,170,113 B1 * | 1/2001 | Cornu | | A46B 5/00 |
| | | | | 15/143.1 |
| 6,253,406 B1 * | 7/2001 | Holland | | A46B 5/00 |
| | | | | 15/143.1 |
| 6,353,960 B1 | 3/2002 | Jannicelli, Jr. | | |
| 6,840,557 B1 * | 1/2005 | Manthey | | A46B 5/00 |
| | | | | 15/144.1 |
| 8,074,947 B2 | 12/2011 | Cella et al. | | |
| 8,714,173 B2 * | 5/2014 | Rosen | | A61H 3/0277 |
| | | | | 135/77 |
| D751,872 S | 3/2016 | Brandon | | |
| 2004/0148724 A1 * | 8/2004 | Katz | | A46B 5/00 |
| | | | | 15/167.1 |
| 2005/0229348 A1 * | 10/2005 | Jones | | A46B 17/02 |
| | | | | 15/168 |
| 2008/0093318 A1 | 4/2008 | Hansen et al. | | |
| 2008/0135696 A1 | 6/2008 | Le May et al. | | |
| 2011/0100404 A1 * | 5/2011 | La Chimia | | A61H 3/0244 |
| | | | | 135/77 |
| 2012/0137548 A1 | 6/2012 | Kimball | | |
| 2013/0153737 A1 * | 6/2013 | Zoeteman | | A45B 23/00 |
| | | | | 248/513 |

* cited by examiner

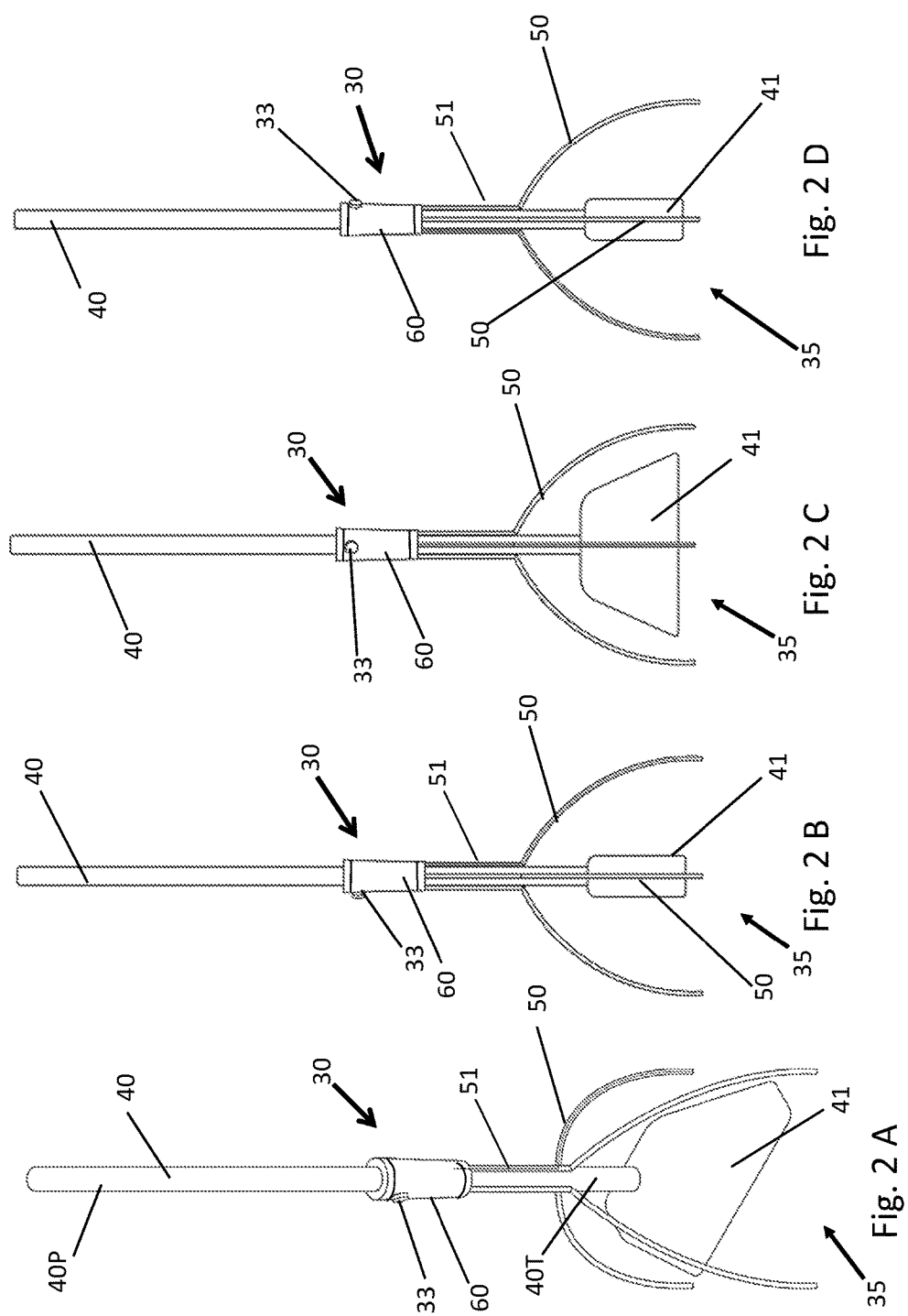

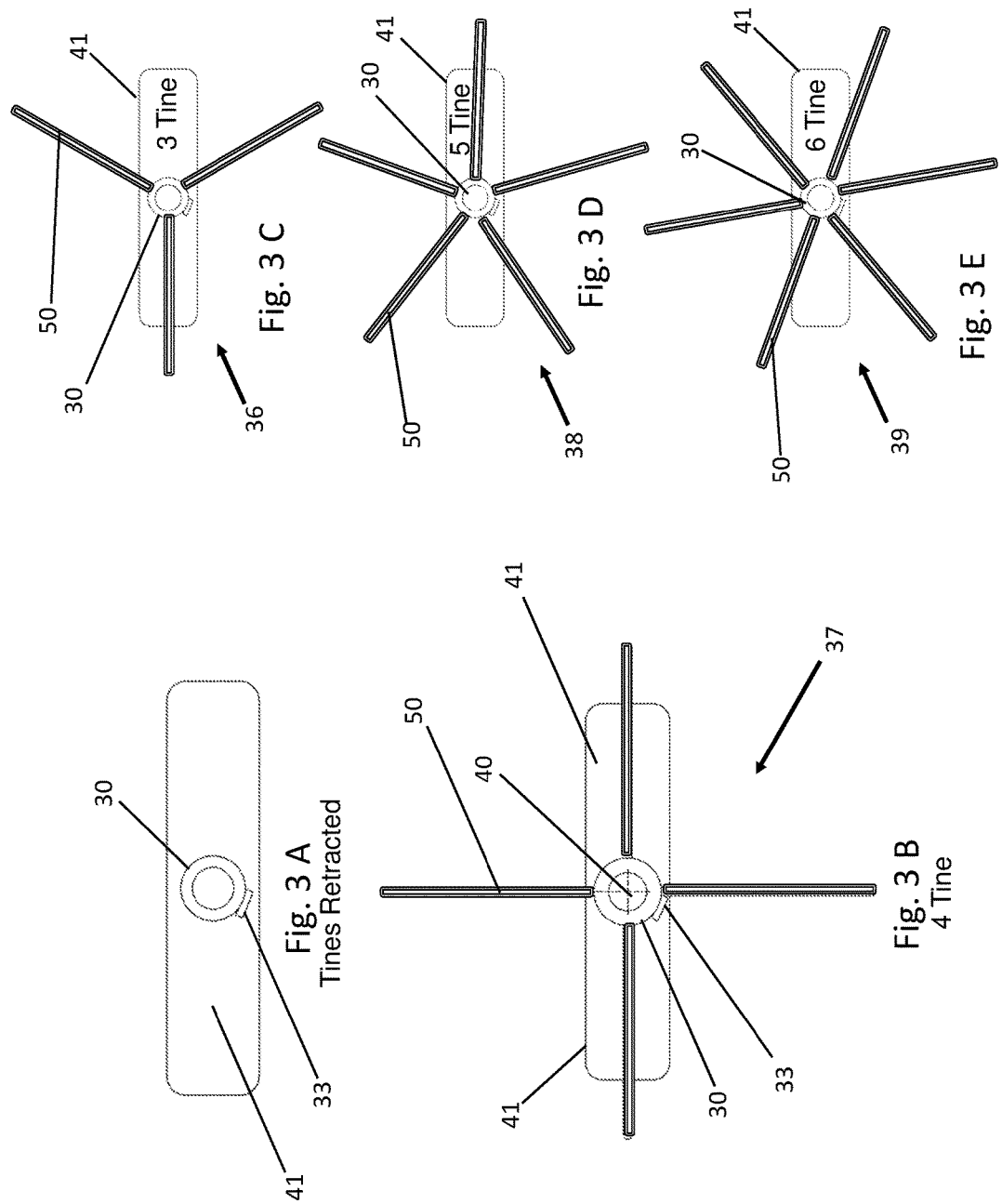

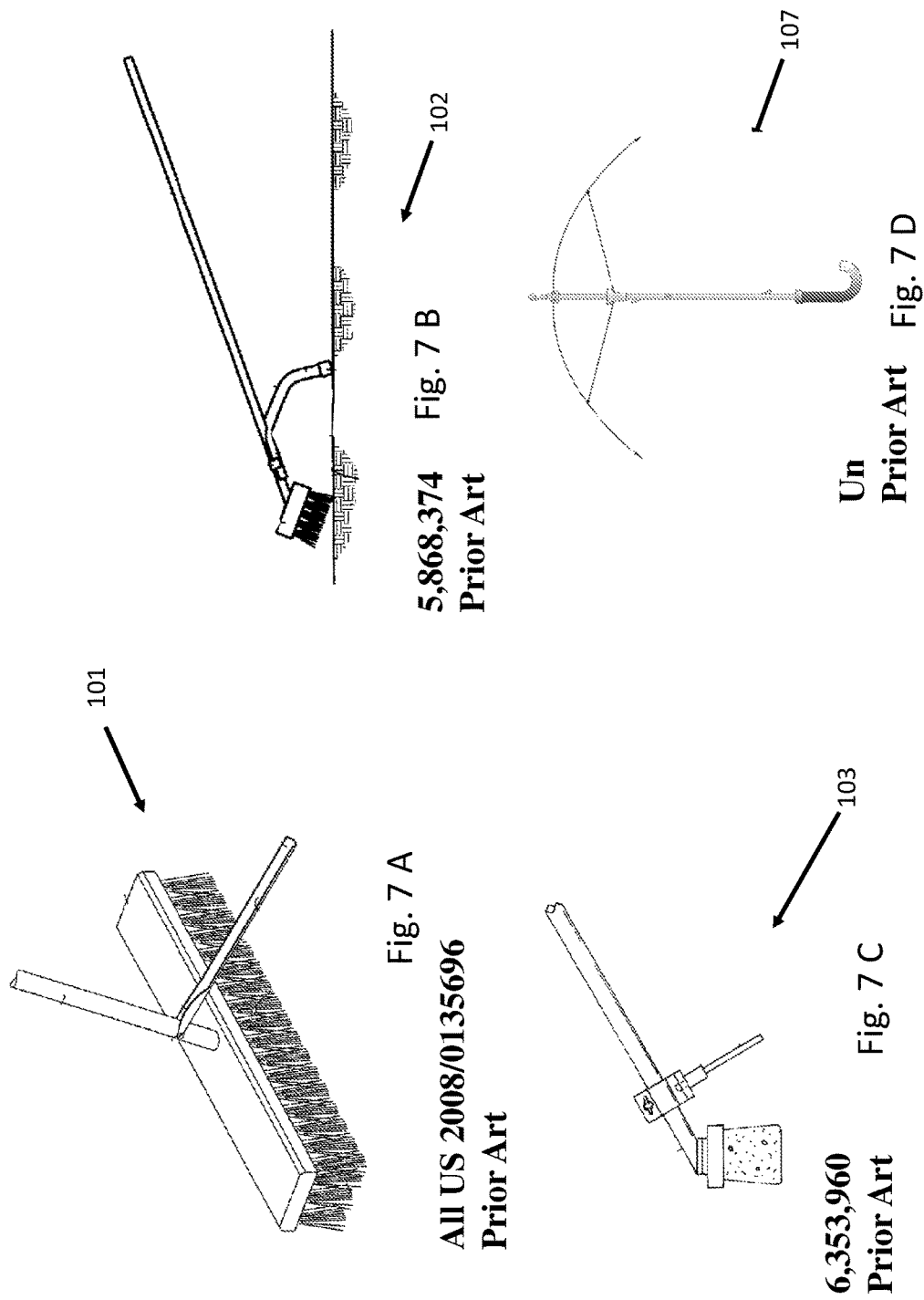

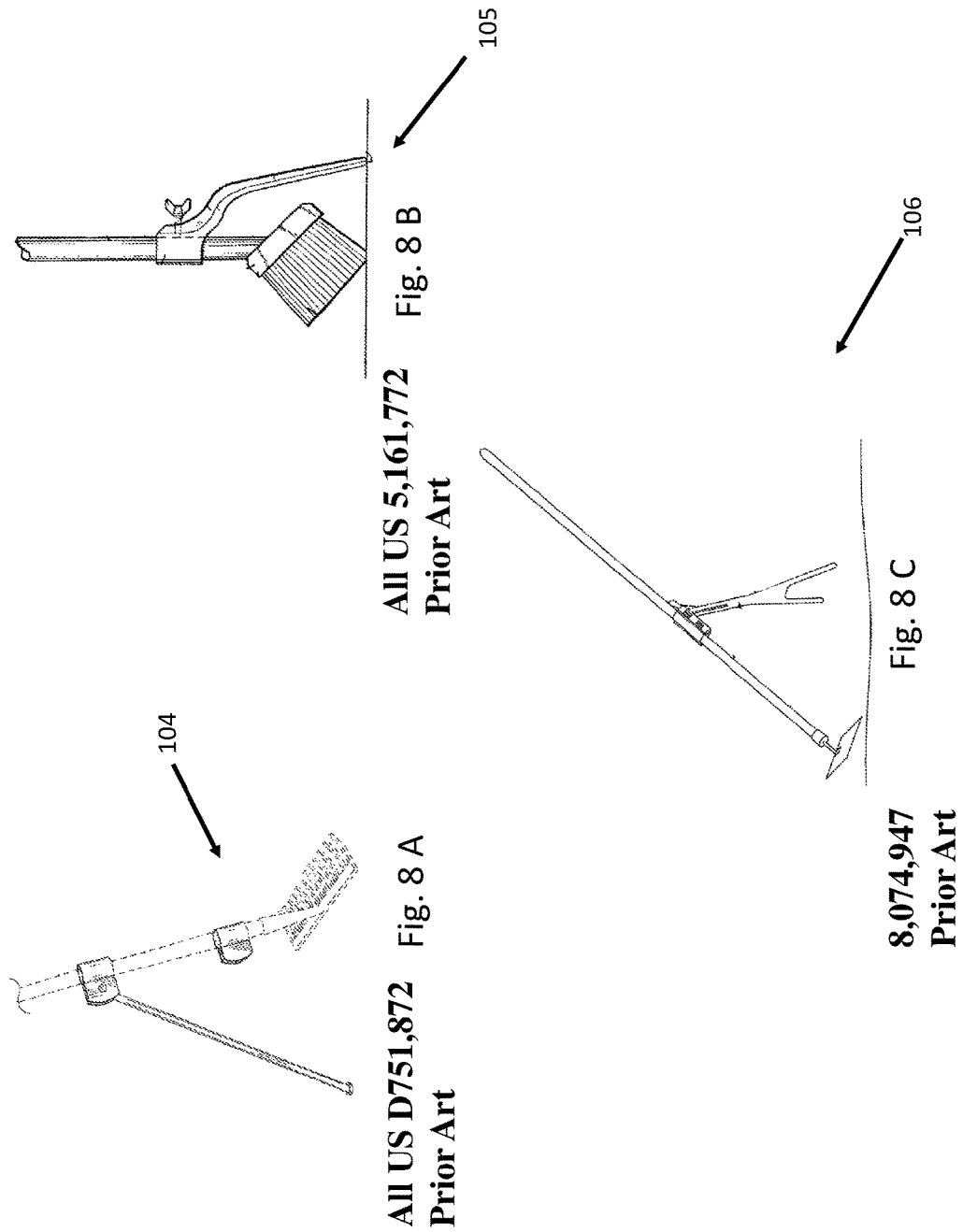

MOP PROP, STICK STAY, AND BROOM BASE

CROSS-REFERENCE TO RELATED APPLICATIONS

This application claims the benefit of U.S. Provisional Patent Application with Ser. No. 62/497,037 filed Nov. 7, 2016, by Katherine Joanne Weber and entitled "Mop Prop, Stick Stay, Broom Base".

FIELD OF INVENTION

This invention relates to a Mop Prop, Stick Stay, Broom Base called a Mop Prop for keeping mops, brooms and long handled tools essentially vertical when temporarily not in use. This device relates generally to a stand to be used on the handles of hand tools; more specifically it relates to a retractable stand device that can be attached to the handles of household, commercial, and/or industrial hand tools, garden, construction, landscaping, maintenance, and that holds the handle in a generally upright or vertical orientation for safety and ease of use in a working environment. This invention is more particularly in the field of long handled tools such a mop designed to relieve excess stress and fatigue for the user of the mops and the danger of injury to the user. The applications anticipate original equipment with tools or as aftermarket uses described and discussed below.

FEDERALLY SPONSORED RESEARCH

None.

SEQUENCE LISTING OR PROGRAM

None.

BACKGROUND—FIELD OF INVENTION AND PRIOR ART

As far as known, there are no other Mop Prop, Stick Stay, and Broom Base called a Mop Prop or the like. It is believed that this product is unique in its design and technologies. This background as to devices to prop extended handled tools should be useful. Tools having a generally elongated handle are known. Such tools typically comprise a tool head and an elongated, cylindrical handle extending therefrom to be grasped by the user for use of the tool. For example, a conventional push broom design comprises a broom head to which bristles are attached and from which an elongated, cylindrical handle extends. Other tools using this general design include rakes, shovels, mops, floor squeegees, concrete floats, paint rollers with extension handles, and the like. The user of the tool typically grasps the handle and positions the tool head for use, often against a surface or material to be worked on. With a push broom, the user grasps the elongated handle and positions the bristles of the broom against a floor or surface to be swept and cleaned. When the tool is not in use, it is preferable to store it in an upright or vertical orientation, often against a wall. Most tools, however, cannot stay in an upright or vertical orientation by themselves. Thus, when a work task is completed, tools can be stored on hooks, in a storage rack, or simply be leaned against a wall of a garage, closet, shed or room.

Commonly, when one is using a tool, the user may take a break from working, for example, to move an object that is in the way, to use another tool to complete a task, to discard gathered debris, or simply to take a rest. During such a break, the user usually will temporarily leave the tool at a non-storage location, often at the spot where the work is being done, such as in the middle of a yard. At such location, there may not be a wall against which to lean the tool, so the user will often lay the tool on the ground or floor at a spot that may be out of the way but is close to where the task will resume once the break is over. In laying the tool on the ground or floor, the tool is typically positioned in a horizontal orientation where it is less visible than a tool in an upright orientation, especially, for example, in long grass or leaves. Consequently, the user may lose track of where the tool has been placed, or where the work has left off, and waste time either looking for the tool or duplicating work.

A tool laying on the ground or floor also poses many hazards. One who is not aware of the location of the tool and can't see it laying in a horizontal orientation on the ground may trip over the tool. Even the actual user of the tool may be prone to tripping over the tool in its temporary storage location. Similarly, one may step on the tool head and cause the end of the handle to propel upwards and hit the person. An inconspicuously positioned tool may be prone to damage if accidentally stepped on or run over by a car or lawn-mower. Further, when a tool is left in a horizontal orientation on the ground, it also poses the risk injury to a user who must reach down to pick up the tool to resume work. Repeated bending down to pick up a tool, especially for task that requires several breaks, can increase the risk of back or muscle injury. Until recently, such long-handled garden tools would be placed on the ground when not in use, allowing for someone to either step on the tools, or to trip over the tools.

PRIOR ART

In recent years, this problem has been addressed in a number of US patents. The design focus of mops, brooms, manual tools and other such the positioning of the handle at any selected angle as the base is wiped across a floor surface. A design patent D751, 872 shows an ornamental design of a Tool Support Stand issued to Brandon in 2016. No functionality is discussed. A patent application US 2012/0137548 was published in 2012. It was a Hand Tool Stand by Kimball. It showed a hand tool (or an add-on accessory for the hand tool) with a handle includes one or more retractable arms that, when unfolded and extended maintains the tool in an upright position while the tool is at rest. It is an attachment coupling the one or more retractable arms to the handle wherein the one or more arms are retracted and secured into a closed position against the handle when the operator desires to resume work. Another publication of an application was to Le May et al in 2008 under US 2008/0135696. It taught a Retractable Tool Stand that is provided for use with a tool having a tool head and a generally elongated tool handle extending therefrom. The tool stand is mounted on the tool handle for articulation between a retracted position, where the stand is positioned generally adjacent to the tool handle so as not to interfere with use of the tool, and an extended position, where the stand generally projects away from the tool handle to engage a support surface to prop up and temporarily store the tool in a generally upright or vertical orientation.

In patent application US 2008/0093318 by Hansen et al demonstrated a "Reconfigurable Garden Tool Caddy Device For Conveniently Supporting And Transporting One Or more Garden Tools To Remote Garden Locations And Enabling The Self-Standing Of Long Handled Garden Tools
}

In The Garden When Not In use. It was a reconfigurable garden tool caddy device that is adapted for mounting to the handle portion of a long-handled garden tool, so as to provide the so equipped garden tool with two primary configurations of operation wherein its stand portion is arranged at a first angle with respect to the handle portion of the long-handled garden tool and supports the garden tool in an upright position at a second angle. Next a U.S. Pat. No. 5,920,944 portrays an Ergonomic Mop Apparatus by Biggs et al. which was issued in 1999. It is a mop handle and method of mopping including a unique construction of a mop handle which consists of a cylindrical elongate handle having an offset intermediate its ends and a rotatable swivel grip on one end, which enables the user of a mop with said handle to mop more efficiently and with reduced risk of injury including repetitive motion injuries and the like. Another U.S. Pat. No. 5,361,447 issued in 1994 to Ophardt for a Free Standing Mop. This invention is a free standing implement such as a mop comprising: an elongate handle having a longitudinal axis; a base having a planar bottom adapted to support the mop with the handle in a free standing upright position; universal coupling means joining the base and handle; a nib having a rounded inward end extending inwardly from the handle beyond the universal coupling toward the base; and socket means, connected to the base and resiliently biased to engage the nib, for providing lateral resistance to brace the handle in said upright position and for releasing the handle to co-act with the base in a universal manner when said axis is positioned at an acute angle relative to the planar bottom.

Further, a U.S. Pat. No. 5,868,374 named a Push Broom Stand issued in 1999 to Lomando. It showed a push broom stand includes an elongated tubular body having a bent shape. The body that includes a receiving section configured to removably receive the handle of a push broom, an extending section oriented at an angle to the receiving section, and a support section oriented at an angle to the extending section. The device is hollow so as to define a sleeve configured to snugly fit around the handle of a broom. A slot extends through at least a portion of the body so that a broom handle may be snapped through the slot into the sleeve. Another U.S. Pat. No. 5,161,772 entitled Stand For Push Brooms and Like Implements was issued to Di Resta et al. in 1992. It provides a stand adapted to be attached to a long handled implement, such as a push broom, a mop, a rake, a floor squeegee and the like, for holding an implement, when it is not being used, on a supporting surface with the handle in a substantial vertical position where it can be quickly grasped for use of the same. The stand includes a leg which may be mounted on the implement handle or on the front end of a part of the body of the implement. The stand leg may be integrally formed with a part of the body of the implement. An older U.S. Pat. No. 3,132,834 named a Handle With Rest Therefor was issued to Adams in 1964, It shows a two section handle for a mop in which the sections are pivotally connected, and which is provided with a T-shaped foot having a rubber covering to prevent slippage on the floor.

Another older U.S. Pat. No. 2,441,697 shows a Mop Stand. The patent issued to Gage in 1948 and related to an apparatus on which a wet article such as a mop can be placed to catch the drippage from the mop. It is a portable stand upon which a wet mop can be supported in a vertical position to drain the water from the article. In 1904, U.S. Pat. No. 754,870 for a Mop Wringer issued to Hill. It showed a mop wringer or press with a leg extending from the bucket edge. A more current U.S. Pat. No. 6,353,960 named Helper attachment devices for cleaning issued to Jannicelli, Jr. in 2002. It teaches a convenient helper attachment device adapted for use in combination with cleaning apparatuses/ units is for use as a universal back up for the cleaning apparatus. The cleaning apparatus has a near end for being held by a user and a far end for supporting the attachment device. The helper clamping assembly is couplable to the attachment device and the head portion is adapted for coupling to a cleaning apparatus/unit. Finally, U.S. Pat. No. 8,074,947 named a Method of using long-handed garden tools, each provided with a reconfigurable garden tool caddy device issued to Cella, et al. in 2011. It is a reconfigurable garden tool caddy device that is adapted for mounting to the handle portion of a long-handled garden tool, so as to provide the so equipped garden tool with two primary configurations of operation, namely: (i) a self-standing configuration, wherein its stand portion is arranged at a first angle with respect to the handle portion of the long-handled garden tool and supports the garden tool in an upright position at a second angle formed with respect to the ground surface of the garden; and (ii) a transport-work configuration, wherein the stand portion is disposed closely adjacent the handle portion of the garden tool and is releasably retained by a stand retainer structure so that the adapted garden tool can be transported between the garden and a tool shed or like shelter where garden tools are kept from the natural elements when not being used to work the soil of a garden.

None of the above prior art elongated handle holders show a device which can be placed over an extreme end of an elongated handle so that the handle successfully maintains the handle in an upright vertical position against the wall anywhere around the circumference of the free end of the handle.

Problem Solved

A conventional long handled tool is not self-supporting when not in use. Generally the handle is placed leaning against a wall or against furniture for support, with the tool resting upon the adjacent floor or ground. When the use of long handle implements is interrupted, or finished, the implement is either dropped to the floor or leaned against a wall or other available vertical support member. If such an implement is dropped on the floor, then when use of the same is renewed, it is necessary to bend down and pick up the implement by the handle. The requirement to bend down many times to pick up such an implement can be the cause of backaches to the user of such a type of implement. If such implements are leaned against a wall, then the wall can be scarred and dirtied. Another disadvantage of dropping such implements on the floor, or leaning them against walls or other support members, is that the handles of the implements can be damaged. THE MOP PROP overcomes these problems and more. One can stop dropping a mop, broom or garden tool in the middle of work! The amateur and professional have a place to put the tool and not interrupt the work. No more leaning it against the wall and creating scrape marks while it falls. No more leaning it against furniture so that there is a hazard that one trips and falls. No crashing into one of the little ones on the way down or taking with it glassware or other objects on its way to the floor! No delays finding where the tool is leaned or bending to retrieve it from the floor or ground. The mop prop universally attaches to any stick on a broom, mop, or other tool and is height adjustable. When one is working, simply retract the mop prop. Then when one needs a break, extend the mop prop down, and walk away!

SUMMARY OF THE INVENTION

This invention is an A Mop Prop, Stick Stay, and Broom Base device for various applications. Taught here are the ways the device can temporary or permanent attach to a: broom, mop, rake, or other such long handle tools. It is a temporary or permanent attachment to a broom, mop, or other such cleaning device that needs to be propped upright temporarily when not in use or permanently during storage. This attachment provides the ability for the stick to stand freely, independent of leaning against a wall, furniture, door or other, to prevent the stick from falling to the ground. This small, compact device fits around a mop stick like a sleeve. Simply push the lever or button on the sleeve and tines spread out like an upside down umbrella, allowing the cleaning device to rest upright on the floor and await the return of the user.

One can just walk away with the pull of a lever or push of a button. The Mop Prop is a small, compact device that clips securely onto a mop handle, like a sleeve. Once the Mop Prop is in place, simply push the lever down, extending tines out like an upside down umbrella. Leave the mop upright and waiting until one gets back to work.

The preferred embodiment of a Mop Prop, Stick Stay, and Broom Base device is comprised of a durable material and used with a tool that has with an extended handle (one end of the handle held by an operator and an opposite end of the handle secured to the tool) the device is comprised of: a) An external case surrounding a group of other components; b) A means for releasably securing the external case to the extended handle at the opposite end of the handle, proximate to the tool; c) the group of other components surrounded by the case comprising: 1) at least three tines made of a semi-rigid and pliable materials; 2) a spring and retainer(s) for extending the tines; 3) a fastening means for securing the tines to the spring; 4) a fastening means to secure the spring the case; and 5) a release means for extending the spring and tines toward the tool end and for releasably holding the spring and tines in a retracted position in the external case wherein the device provides a temporary or permanent attachment to a tool that has an extended handle and which can allow the tool and device to be propped upright temporarily when not in use and can provide the ability for the tool to stand freely and independently of leaning against a wall, furniture, door and to prevent the stick from falling to the ground, against other objects, people, and pets on its way down to the ground. The newly invented Mop Prop, Stick Stay, and Broom Base device for various applications may be manufactured at low volumes by very simple means and in high volume production by more complex and controlled systems.

Objects and Advantages

There are several objects and advantages of the Mop Prop, Stick Stay, and Broom Base device. There are currently no known tool props or similar devices that are effective at providing the objects of this invention. The various advantages and benefits are in Table A:

| Item | Advantages |
|---|---|
| 1 | Keeps mop essentially vertical. |
| 2 | Eliminates leaning on walls, and scrapes on those walls when it falls. |
| 3 | Eliminates leaning on furniture. |
| 4 | Eliminates potentially tripping on those 'leaned' tools. |
| 5 | Prevents damage to items such as glassware from a falling mop. |
| 6 | Helps eliminate awkward bending and stooping - an ergonomic solution |
| 7 | Saves time of locating the mop and bringing it to where it was temporarily placed |
| 8 | Universally fits most handles |
| 9 | Can be original equipment with the tool or added later to an existing tool |
| 10 | Is lightweight and durable |
| 11 | Can be installed with no or simple tools |
| 12 | For professional cleaners of big spaces - eliminates dragging other equipment to 'save your place', or dropping the tool in place to save location |
| 13 | Organizes ones closet without having to install wall hook - makes each tool easier to get to. |
| 14 | Attaches to mop, broom, rake, and is height adjustable. |

Finally, other advantages and additional features of the present Mop Prop, Stick Stay, and Broom Base device will be more apparent from the accompanying drawings and from the full description of the device. For one skilled in the art of tool bases and stand devices, it is readily understood that the features shown in the examples with this product are readily adapted to other types of propping systems and devices.

DESCRIPTION OF THE DRAWINGS—FIGURES

The accompanying drawings, which are incorporated in and constitute a part of this specification, illustrate an embodiment of the Mop Prop, Stick Stay, and Broom Base device for various applications device that is preferred. The drawings together with the summary description given above and a detailed description given below serve to explain the principles of the propping device. It is understood, however, that the demonstrated and claimed device is not limited to only the precise arrangements and instrumentalities shown.

FIGS. 2A through 2D are sketches from various views of the general mop prop, stick stay and broom base with components and features noted.

FIG. 3A through 3E are sketches of the mop prop, stick stay and broom base with various tine configurations and with components and features shown from generally a top view.

FIGS. 7A through 7D are prior art devices.

FIGS. 8A through 8C are prior art devices.

DESCRIPTION OF THE DRAWINGS—REFERENCE NUMERALS

Figure 1A:
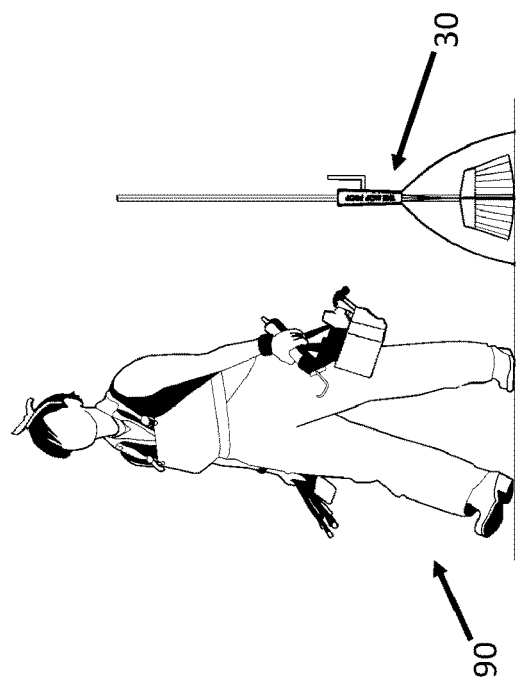
FIGS. 1A through 1C are sketches of the general mop prop, stick stay and broom base for various applications.

The following list refers to the drawings:

TABLE B

Reference numbers

| Ref # | Description |
|---|---|
| 30 | mop prop, stick stay and broom base holding device 30 |
| 33 | release mechanism 33 |
| 35 | mop, broom, or tool 35 with prop 30 attached |
| 36 | three (3) tine mechanism 36 |
| 37 | four (4) tine mechanism 37 |
| 38 | five (5) tine mechanism 38 |
| 39 | six (6) tine mechanism 39 |
| 40 | typical extended handle 40 for a mop, broom, lightweight tool (outdoor, garden, or household) |
| 40P | person/operator end 40P of extended handle |
| 40T | opposite end 40T proximate to tool end 41 of extended handle |
| 41 | typical tool head 41 such as a mop, broom, squeegee, lightweight rake, leaf rake, garden rake, hoe, etc., for an example and not as a limitation |
| 50 | extended curved tine 50 of the mop prop, stick stay and broom base holding device |
| 51 | vertical/straight tine 51 of the mop prop, stick stay and broom base holding device |
| 60 | mop prop device body and exterior case 60 that surrounds the other interior components (optionally has a slightly tapered interior up to approximately seven [7] degrees to assure a tight fit to extended handle) |
| 61 | top spring retainer 61 |
| 62 | bottom spring retainer and extender ring 62 |
| 62C | extender ring 62 collapsed 62C |
| 62E | extender ring 62 extended 62E |
| 62M | extension motion 62M |
| 64 | means 64 for securing tines to extender ring 62E such as rivet, weld, insert mold, etc. as examples and not limitations |
| 65 | spring (for example compression 65B, wave 65D, extension 65C, helical 65A, cylindrical 65E, etc.) |
| 67 | means 67 for securing spring 65 to top spring retainer 61 such as rivet, weld, insert mold, etc. as examples and not limitations |
| 70 | release button 70 |
| 71 | release latch 71 |
| 72 | latch opening 72 |
| 73 | latch lock 73 |
| 74 | spring tee release pin 74 |
| 80 | means 80 for securing mop prop device body and exterior case 60 through threaded apertures 80A to extended handle 40 near the tool end 40T |
| 80A | threaded aperture 80A |
| 81 | round head bolt 81 |
| 82 | wing bolt 82 |
| 83 | hex bolt 83 |
| 84 | circular ring wedge 84 |
| 85 | shim 85 |
| 86 | optional double sided adhesive 86 |
| 87 | Clamp 87 and bolt 83 |
| 89 | hex nut 89 |
| 90 | person/operator 90 using mop prop, stick stay and broom base holding device |
| 101 | Prior art 101 US Publication 2008/0135696 |
| 102 | Prior art 102 U.S. Pat. No. 5,868,374 |
| 103 | Prior art 103 U.S. Pat. No. 6,353,960 |
| 104 | Prior art 104 U.S. Deign Pat. No. D 751,872 |
| 105 | Prior art 105 U.S. Pat. No. 5,161,772 |
| 106 | Prior art 106 U.S. Pat. No. 8,074,947 |
| 107 | Prior art 107 Typical Umbrella |

DETAILED DESCRIPTION OF PREFERRED EMBODIMENT

The present development is a Mop Prop, Stick Stay, and Broom Base. This invention relates to a Mop Prop, Stick Stay, Broom Base called a Mop Prop for keeping mops, brooms and long handled tools essentially vertical when temporarily not in use. This device relates generally to a stand to be used on the handles of hand tools; more specifically it relates to a retractable stand device that can be attached to the handles of household hand tools, garden, construction, landscaping, maintenance, and that holds the handle in a generally upright or vertical orientation for safety and ease of use in a working environment. This invention is more particularly in the field of long handled tools such a mop designed to relieve excess stress and fatigue for the user of the mops and the danger of injury to the user.

The advantages for the Mop Prop, Stick Stay, and Broom Base device 30 are listed above in the introduction. Succinctly the benefits are that the device:

Keeps mop essentially vertical.

Eliminates leaning on walls, and scrapes on those walls when it falls.

Eliminates leaning on furniture.

Eliminates potentially tripping on those 'leaned' tools.

Prevents damage to items such as glassware from a falling mop.

Helps eliminate awkward bending and stooping—an ergonomic solution

Saves time of locating the mop and bringing it to where it was temporarily placed Universally fits most handles Can be original equipment with the tool or added later to an existing tool Is lightweight and durable Can be installed with no or simple tools For professional cleaners of big spaces—eliminates dragging other equipment to 'save your place', or dropping the tool in place to save location Organizes ones closet without having to install wall hook—makes each tool easier to get to.

Attaches to mop, broom, rake, and is height adjustable.

The preferred embodiment of a Mop Prop, Stick Stay, and Broom Base device 30 is comprised of a durable material and used with a tool that has with an extended handle (one end of the handle held by an operator and an opposite end of the handle secured to the tool) the device is comprised of: a) An external case surrounding a group of other components; b) A means for releasably securing the external case to the extended handle at the opposite end of the handle, proximate to the tool; c) the group of other components surrounded by the case comprising: 1) at least three tines made of a semi-rigid and pliable materials; 2) a spring and retainer(s) for extending the tines; 3) fastening means for securing the tines to the spring; 4) a fastening means to secure the spring the case; and 5) a release means for extending the spring and tines toward the tool end and for releasably holding the spring and tines in a retracted position in the external case wherein the device provides a temporary or permanent attachment to a tool that has an extended handle and which can allow the tool and device to be propped upright temporarily when not in use and can provide the ability for the tool to stand freely and independently of leaning against a wall, furniture, door and to prevent the stick from falling to the ground, against other objects, people, and pets on its way down to the ground.

There is shown in FIGS. 1-8 a complete description and operative embodiment of the Mop Prop, Stick Stay, and Broom Base device 30. In the drawings and illustrations, one notes well that the FIGS. 1-8 demonstrate the general configuration and use of this product. The various example uses are in the operation and use section, below.

The accompanying drawings, which are incorporated in and constitute a part of this specification, illustrate an embodiment of the Mop Prop, Stick Stay, and Broom Base device 30 that is preferred. The drawings together with the summary description given above and a detailed description given below serve to explain the principles of the propping device 30. It is understood, however, that the device 30 is not limited to only the precise arrangements and instrumentalities shown. Other examples of vertical and upright propping devices and uses are still understood by one skilled in the art of tool bases and stand devices to be within the scope and spirit shown here.

Figure 1B:
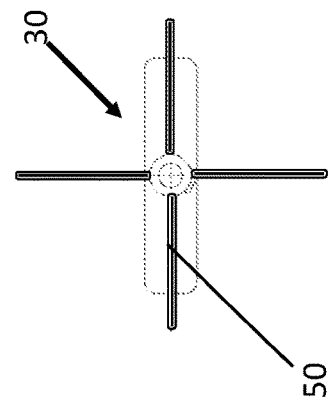
Figure 1C:
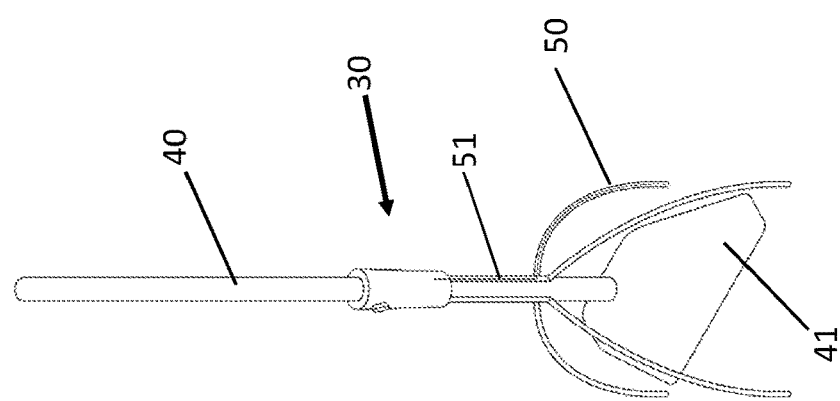
Figure 4:
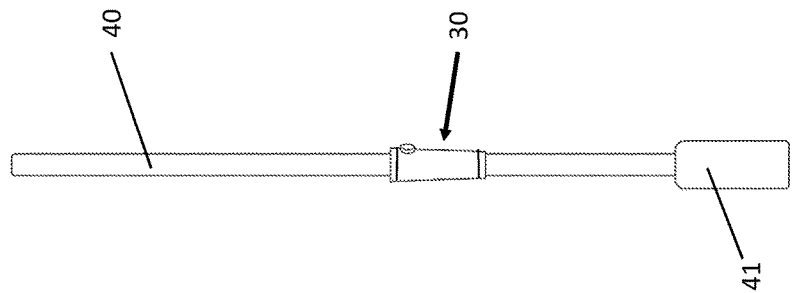
FIGS. 4A through 4D are sketches of the mop prop, stick stay and broom base from a front, each side and a perspective view.
Figure 4:
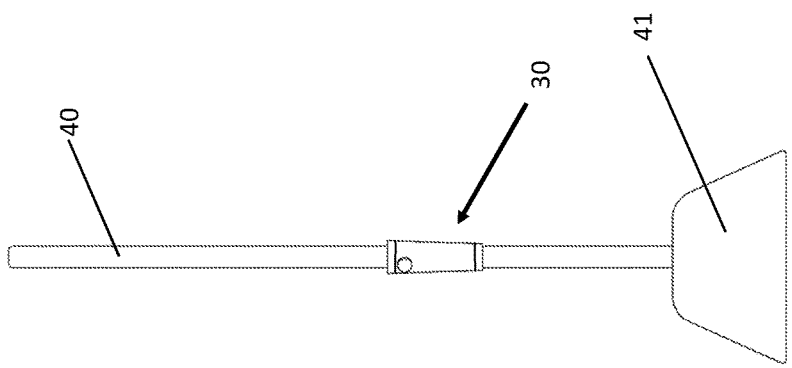
Figure 4:
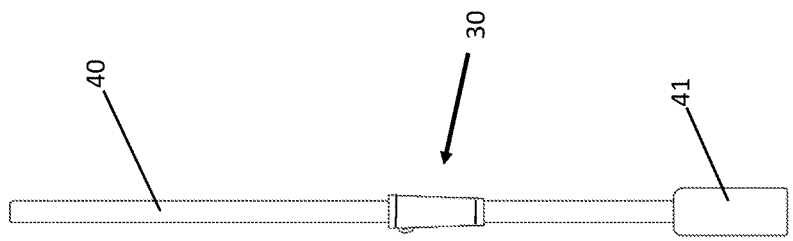
Figure 4:
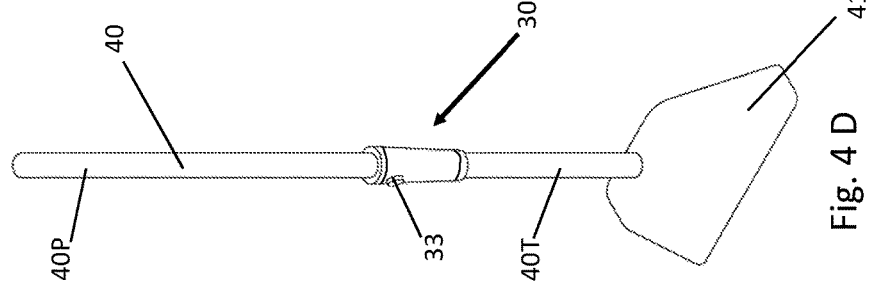
Figure 5:
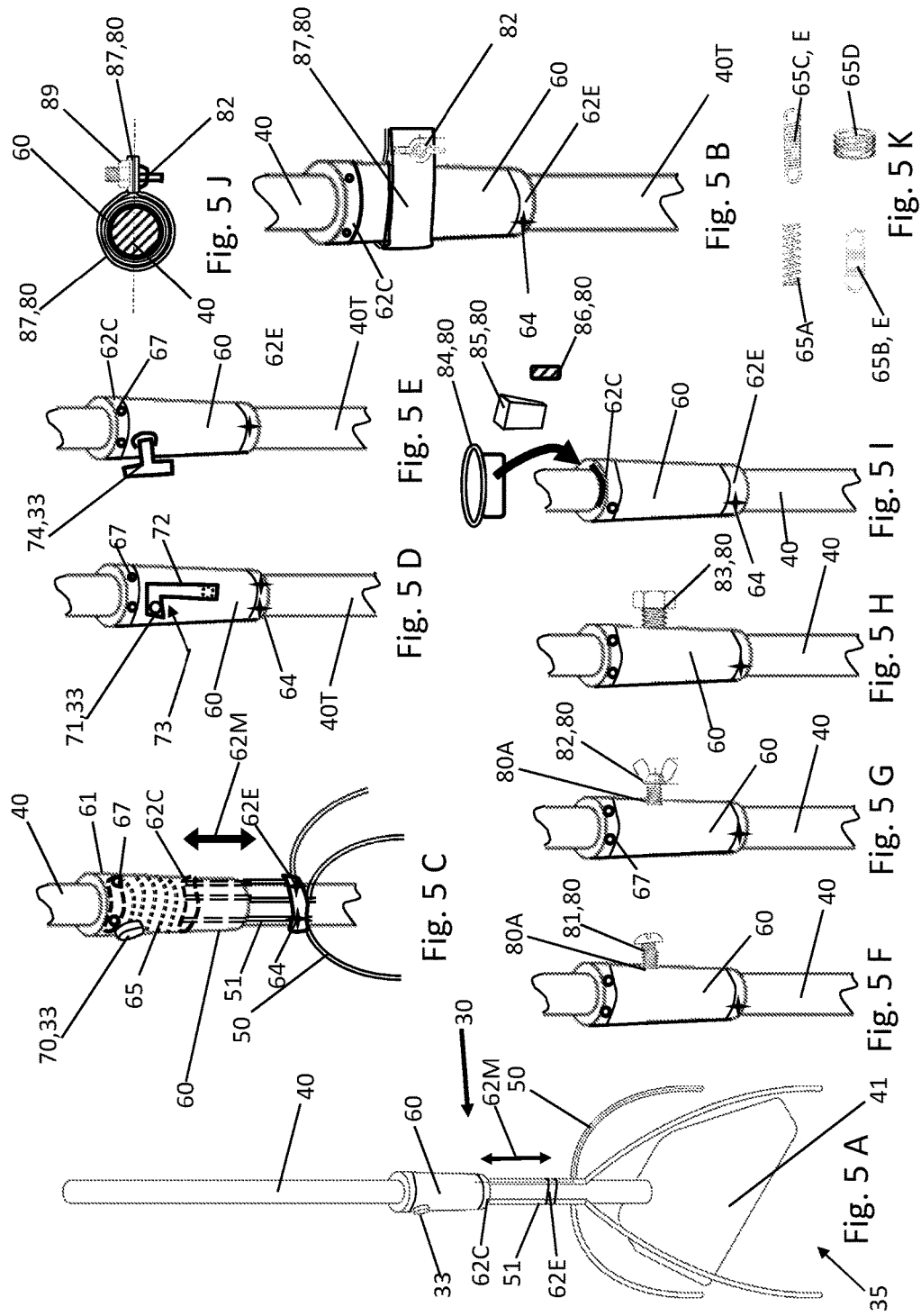
FIGS. 5A and 5K are more sketches of the release mechanisms and securing mechanisms for the mop prop, stick stay and broom base.

FIGS. 1A through 1C are sketches of the general mop prop, stick stay and broom base device 30 for various applications. In these views are shown: a mop prop, stick stay and broom base holding device 30; a typical extended handle 40 for a mop, broom, lightweight tool (outdoor, garden, or household); a typical tool head 41 such as a mop, broom, squeegee, lightweight rake, leaf rake, garden rake, hoe, etc., for an example and not as a limitation; an extended curved tine 50 of the mop prop, stick stay and broom base holding device; a vertical/straight tine 51 of the mop prop, stick stay and broom base holding device; and a person/operator 90 using mop prop, stick stay and broom base holding device.

FIGS. 2A through 2D are sketches from various views of the general mop prop, stick stay and broom base device 30 with components and features noted. Demonstrated in these sketches are: a mop prop, stick stay and broom base holding device 30; a release mechanism 33; a mop, broom, or tool 35 with prop 30 attached; a typical extended handle 40 for a mop, broom, lightweight tool (outdoor, garden, or household); a typical tool head 41 such as a mop, broom, squeegee, lightweight rake, leaf rake, garden rake, hoe, etc., for an example and not as a limitation; an extended curved tine 50 of the mop prop, stick stay and broom base holding device; a vertical/straight tine 51 of the mop prop, stick stay and broom base holding device; and a mop prop device body and exterior case 60 that surrounds the other interior components (optionally has a slightly tapered interior up to approximately seven [7] degrees to assure a tight fit to extended handle).

FIG. 3A through 3E are sketches of the mop prop, stick stay and broom base device 30 with various tine configurations and with components and features shown from generally a top view. Provided by these views are: a mop prop, stick stay and broom base holding device 30; a release mechanism 33; three (3) tine mechanism 36; four (4) tine mechanism 37; five (5) tine mechanism 38; six (6) tine mechanism 39; and an extended curved tine 50 of the mop prop, stick stay and broom base holding device.

FIGS. 4A through 4D are sketches of the mop prop, stick stay and broom base device 30 from a front, each side and a perspective view. In these view one can see: a mop prop, stick stay and broom base holding device 30; a release mechanism 33; a typical extended handle 40 for a mop, broom, lightweight tool (outdoor, garden, or household); and a typical tool head 41 such as a mop, broom, squeegee, lightweight rake, leaf rake, garden rake, hoe, etc., for an example and not as a limitation.

FIGS. 5A and 5K are more sketches of the release mechanisms and securing mechanisms for the mop prop, stick stay and broom base device 30. These views show the many options for connecting and securing the external case 60 as well as the various internal components. Demonstrated are: a mop prop, stick stay and broom base holding device 30; a release mechanism 33; a mop, broom, or tool 35 with prop 30 attached; a typical extended handle 40 for a mop, broom, lightweight tool (outdoor, garden, or household); a typical tool head 41 such as a mop, broom, squeegee, lightweight rake, leaf rake, garden rake, hoe, etc., for an example and not as a limitation; an extended curved tine 50 of the mop prop, stick stay and broom base holding device; a vertical/straight tine 51 of the mop prop, stick stay and broom base holding device; a mop prop device body and exterior case 60 that surrounds the other interior components (optionally has a slightly tapered interior up to approximately seven [7] degrees to assure a tight fit to extended handle); a top spring retainer 61; a bottom spring retainer and extender ring 62; an extender ring 62 collapsed 62C; an extender ring 62 extended 62E; an extension motion 62M; a means 64 for securing tines to extender ring 62E such as rivet, weld, insert mold, etc. as examples and not limitations; a spring 65 with a top end and a bottom end (for example compression 65B, wave 65D, extension 65C, helical 65A, cylindrical 65E, etc.); a means 67 for securing spring 65 to top spring retainer 61 and case 60 such as rivet, weld, insert mold, etc. as examples and not limitations; a means 67 for securing spring 65 to top spring retainer 61 and case 60 such as rivet, weld, insert mold, etc. as examples and not limitations; a release button 70; a release latch 71; a latch opening 72; a latch lock 73; a spring tee release pin 74; a means 80 for securing mop prop device body and exterior case 60 through threaded apertures 80A to extended handle 40 near the tool end 40T; a threaded aperture 80A; a round head bolt 81; a wing bolt 82; a hex bolt 83; a circular ring wedge 84; a shim 85; an optional double sided adhesive 86; a clamp 87 and bolt 83; and a hex nut 89.

Figure 6:
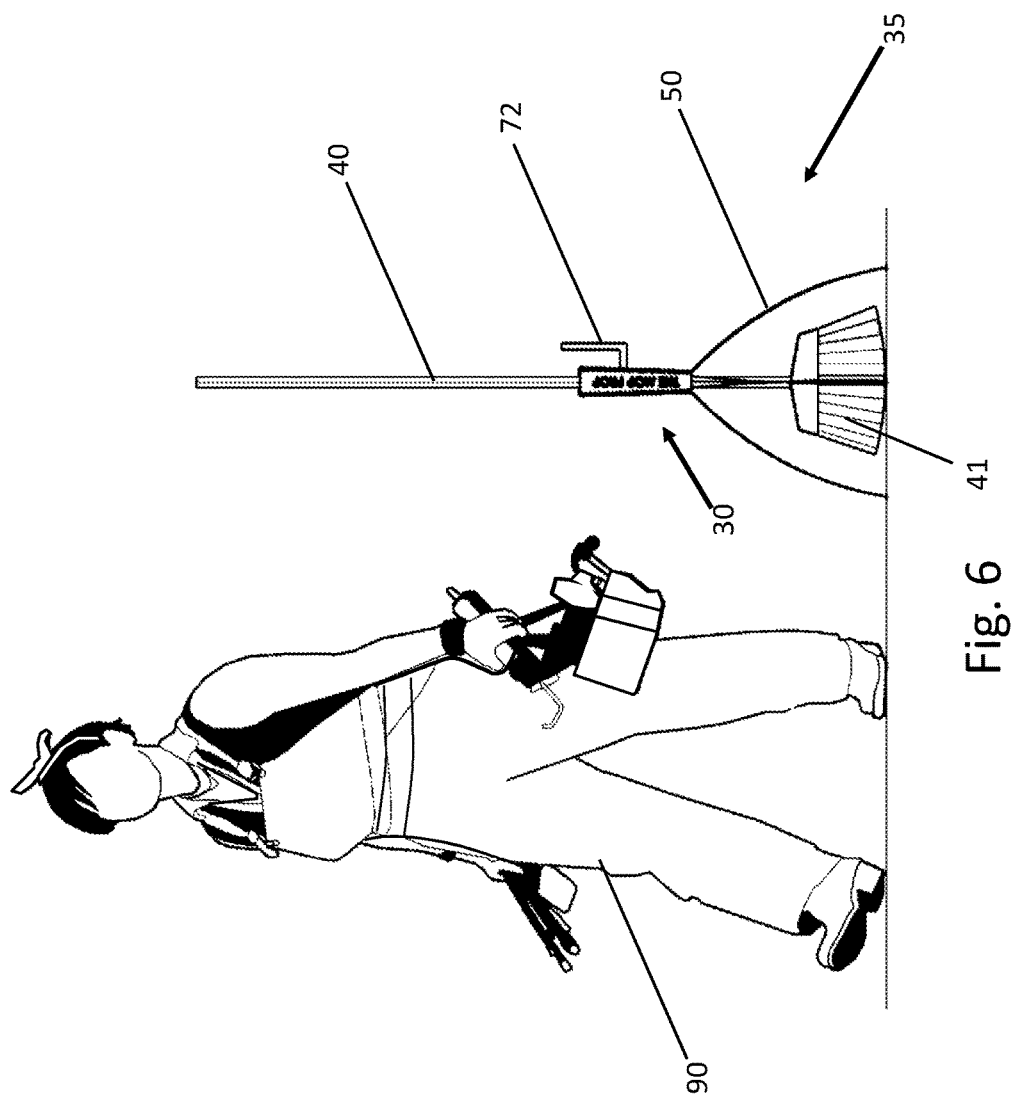
FIG. 6 is a sketch of the mop prop, stick stay and broom base device and user.

FIG. 6 is a sketch of the mop prop, stick stay and broom base device 30 and user 90.

Exhibited in these views are: a mop prop, stick stay and broom base holding device 30; a typical extended handle 40 for a mop, broom, lightweight tool (outdoor, garden, or household); a typical tool head 41 such as a mop, broom, squeegee, lightweight rake, leaf rake, garden rake, hoe, etc., for an example and not as a limitation; a person/operator 90 using mop prop, stick stay and broom base holding device; a release mechanism 33; a mop, broom, or tool 35 with prop 30 attached; an extended curved tine 50 of the mop prop, stick stay and broom base holding device; and a release latch 71.

Of note one should consider the durable materials for the case 60, three (3) tine mechanism 36; four (4) tine mechanism 37; five (5) tine mechanism 38; six (6) tine mechanism 39. The durable material of the external case 60 may be an alloy steel, a stainless steel, a composite material, reinforced plastic, or similar like materials. The durable material of the tines 36, 37, 38, 39 can be an alloy steel, a stainless steel, a flat composite material, a reinforced plastic; a spring steel; or similar like materials.

FIGS. 7A through 7D are prior art devices. These include: a Prior art 101 US Publication 2008/0135696; a Prior art 102 U.S. Pat. No. 5,868,374; a Prior art 103 U.S. Pat. No. 6,353,960; a Prior art 107 Typical Umbrella. The umbrella works on this principle: Waterproof material is stretched over a circular fan of ringy metal ribs that attach at the top of the umbrella shaft. These, in turn, are supported by metal stretchers attached to a runner that slides up and down the central shaft. Without the stretchers, the umbrella would not work. While each part of the umbrella is necessary for its operation, the runner is the part that opens and closes it. When the runner is all the way down, the stretchers are folded flat against the shaft and the umbrella is "closed," with the waterproof material and the ribs wrapped around the shaft. To open the umbrella, the user slides the runner all the way to the top. The stretchers extend, raising the ribs to which they are attached and spreading the material tight over the ribs. A flat spring toward the bottom of the shaft, and another just below the point where the stretchers are fully extended, lock the umbrella at the open or closed position. The runner slides upward over the extended top spring, which retracts into the shaft out of the way until the runner has passed over it, at which time it springs back out, preventing the runner from sliding back down the shaft. Now the umbrella is locked "open." To close it, the user must manually depress the top spring to allow the runner to slide back down. The bottom spring now comes into play. The runner passes over it to halt just above the umbrellas handle. The spring opens and locks the runner, keeping the umbrella neatly closed. FIGS. 8A through 8C are prior art devices. Included are a Prior art 104 U.S. Design Pat. No. D751,872; a Prior art 105 U.S. Pat. No. 5,161,772; and a Prior art 106 U.S. Pat. No. 8,074,947. The patents and applications are described above in prior art.

The details mentioned here are exemplary and not limiting. Other specific components and manners specific to describing a Mop Prop, Stick Stay, and Broom Base device 30 may be added as a person having ordinary skill in the field of the art of tool bases and vertical stand devices and their uses well appreciates.

Operation of the Preferred Embodiment

The Mop Prop, Stick Stay, and Broom Base device 30 has been described in the above embodiment. The manner of how the device operates is described below. One notes well that the description above and the operation described here must be taken together to fully illustrate the concept of the propping device 30. The preferred embodiment of a Mop Prop, Stick Stay, and Broom Base device 30 is comprised of a durable material and used with a tool 41 that has with an extended handle 40 (one end of the handle held by an operator 400 and an opposite end 40T of the handle secured to the tool) the device is comprised of: a) An external case 60 surrounding a group of other components; b) A means 67 for releasably securing the external case 60 to the extended handle 40 at the opposite end of the handle, proximate to the tool 41; c) the group of other components surrounded by the case comprising: 1) at least three tines 36,37, 38, 39 made of a semi-rigid and pliable materials; 2) a spring 65 and retainer(s) 61,62 for extending the tines 36,37, 38, 39; 3) fastening means for securing 64 the tines to the spring; a means 67 for securing spring 65 to top spring retainer 61 and case 60 such as rivet, weld, insert mold, etc. as examples and not limitations; 5) a release means 33 for extending the spring 65 and tines 36,37, 38, 39 toward the tool 41 end and for releasably holding the spring 65 and tines 36,37, 38, 39 in a retracted position in the external case 60 wherein the device 30 provides a temporary or permanent attachment to a tool 41 that has an extended handle 45 and which can allow the tool and device 35 to be propped upright temporarily when not in use and can provide the ability for the tool and handle 35 to stand freely and independently of leaning against a wall, furniture, door and to prevent the stick from falling to the ground, against other objects, people, and pets on its way down to the ground.

The Mop Prop, Stick Stay, Broom Base device 30 operates somewhat similar to a conventional inverted umbrella: attach the Mop Prop 30 to the handle 40 with the releaseable means 67 near the tool end 40T; the operator 90 uses the release device 33; and the operator 90 walks away. It's that easy. This small, compact device 30 fits around a mop stick 40 like a sleeve. Simply push the release lever 33 on the external case/sleeve 60 and tines 36,37, 38, 39 spread out like an upside down umbrella, allowing the cleaning device to rest on the floor, upright, and await the operator's return. It is a temporary or permanent attachment to a broom, mop, or other such cleaning device that needs to be propped upright temporarily when not in use or permanently during storage. This attachment provides the ability for the stick to stand freely, independent of leaning against a wall, furniture, door or other, to prevent the stick from falling to the ground. One simply pushes the release lever 33 on the case/sleeve 60 and tines spread.

Uses with many tools are anticipated for the Mop Prop, Stick Stay, and Broom Base device 30. Some examples, and not limitations, of the household tools and garden tools are shown in the following Table C:

| ITEM | DESCRIPTION |
|---|---|
| 1 | mop |
| 2 | broom |
| 3 | garden rake |
| 4 | leaf rake |
| 5 | hoe |
| 6 | floor squeegee |
| 7 | push broom |
| 8 | simple garden row cultivator |
| 9 | other long handle tools |

The Mop Prop lets any of these instruments stand freely, without leaning against and possibly marking or otherwise damaging a wall, furniture, door, or other surface!

With this description it is to be understood that the Mop Prop, Stick Stay, and Broom Base device 30 is not to be limited to only the disclosed embodiment of product. The features of the propping device 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The invention claimed is:

1. A propping and base device used with a tool that has with an extended handle, the handle having one end holdable by an operator and an opposite end of the handle securable to the tool, the propping and base device is comprised of:
   a) an external case made of a durable material and surrounding a group of other components;
   b) a means for releasably securing the external case to the extended handle at the opposite end of the handle, proximate to the tool;
   c) the group of other components surrounded by the case comprising:
      1) at least three tines made of a semi-rigid and pliable durable material;
      2) a spring, with a top end and a bottom end, and a bottom retainer ring for extending the tines;
      3) a fastening means for securing the tines to the bottom of the spring and bottom ring;
      4) a fastening means for securing the top end of the spring to the top ring and the case; and
      5) a release means for extending the spring and tines toward the tool end and for releasably holding the spring and tines in a retracted position in the external case wherein the device provides a temporary or permanent attachment to a tool that has an extended handle and which can allow the tool and device to be propped upright temporarily when not in use and can provide the ability for the tool to stand freely and independently of leaning against a wall, furniture, door and to prevent the tool and device from falling to the ground, against other objects, people, and pets on its way down to the ground.

2. The propping and base device according to claim 1 wherein the means for releasably securing the external case to the extended handle is selected from the group consisting of a round head bolt, a wing bolt, a hex bolt, a circular ring wedge, a shim, a double sided adhesive, and a clamp with a bolt and a nut.

3. The propping and base device according to claim 1 wherein the at least three tines is selected from the group consisting of three (3) tine mechanisms; four (4) tine mechanisms; five (5) tine mechanisms; and six (6) tine mechanisms.

4. The propping and base device according to claim 1 wherein the release means for extending and retracting the tines in the external case is selected from the group consisting of a release button, a release latch with a latch opening and lock, and a spring tee release pin.

5. The propping and base device according to claim 1 wherein the spring is selected from the group consisting of a compression spring, a wave spring, an extension spring, a helical spring, and a cylindrical spring.

6. The propping and base device according to claim 1 wherein the fastening means to secure the tines to the extending bottom ring and bottom of the spring is selected from the group consisting of a rivet, a weld, and an insert molded tine.

7. The propping and base device according to claim 1 wherein the fastening means to secure the top end of the spring to the top retainer and external case is selected from the group consisting of a rivet, a weld, and an insert molded tine.

8. The propping and base device according to claim 1 wherein the durable material of the external case is selected from the group consisting of an alloy steel, a stainless steel, a composite material, and a reinforced plastic.

9. The propping and base device according to claim 1 wherein the durable material of the tines is selected from the group consisting of an alloy steel, a stainless steel, a flat composite material, a reinforced plastic; and a spring steel.

10. The tool which is used with the propping and base device according to claim 1 is selected from the group consisting of a mop, a broom, a garden rake, a leaf rake, a hoe, a floor squeegee, a push broom, a simple garden row cultivator, and other long handle tools.

11. A propping and base device used with a tool that has with an extended handle, the handle having one end holdable by an operator and an opposite end of the handle securable to the tool, the propping and base device is comprised of:
  a) an external case made of a durable plastic and surrounding a group of other components;
  b) a wing bolt and threaded aperture that releasably securing the external case to the extended handle at the opposite end of the handle, proximate to the tool;
  c) the group of other components surrounded by the case comprising:
    1) four tines made of a spring steel;
    2) an extension spring, with a top end and a bottom end, and a bottom retainer ring for extending the tines;
    3) a rivet that secures the tines to the bottom of the compression spring and bottom ring;
    4) a rivet that secures the spring to the top ring and case; and
    5) a latch for extending the spring and tines toward the tool end and for releasably holding the spring and tines in a retracted position in the external case wherein the device provides a temporary or permanent attachment to a tool that has an extended handle and which can allow the tool and device to be propped upright temporarily when not in use and can provide the ability for the tool to stand freely and independently of leaning against a wall, furniture, door and to prevent the tool and device from falling to the ground, against other objects, people, and pets on its way down to the ground.

* * * * *